United States Patent [19]

Takahashi et al.

[11] 4,151,905
[45] May 1, 1979

[54] OPERATOR CARRIAGE

[75] Inventors: Ken Takahashi, Tokyo; Hajime Endo, Kushiro, both of Japan

[73] Assignee: Taiheiyo Engineering Incorporated, Tokyo, Japan

[21] Appl. No.: 806,213

[22] Filed: Jun. 13, 1977

[30] Foreign Application Priority Data

Dec. 20, 1976 [JP] Japan .................. 51-52094

[51] Int. Cl.$^2$ .................. E21F 13/06; B61B 7/00
[52] U.S. Cl. .................. 198/321; 104/165; 104/173 R; 104/233; 187/12
[58] Field of Search .................. 198/321; 187/12; 104/165, 172 R, 173 R, 224, 229, 232, 233

[56] References Cited

U.S. PATENT DOCUMENTS

| 176,136 | 4/1876 | Hovey | 104/233 |
|---|---|---|---|
| 3,014,556 | 12/1961 | Stelzer | 187/12 |
| 3,213,997 | 10/1965 | Fryer | 198/321 |

FOREIGN PATENT DOCUMENTS 2036360  1/1972  Fed. Rep. of Germany ........... 198/321

*Primary Examiner*—Robert B. Reeves
*Assistant Examiner*—Jeffrey V. Nase
*Attorney, Agent, or Firm*—Frank J. Jordan

[57] ABSTRACT

An operator carriage intended to be used at a long-walled pit face in a coal or metal mine and comprising endlessly running members arranged at both ends of a conveyor and driven by a motor, an operation table suspendedly attached to the side of a spill plate of the conveyor and supported by running supports such as guide rollers which are engaged with guide rails attached to the same side of the spill plate, and a carrying mechanism arranged at the operation table so as to hold the endlessly running members.

5 Claims, 3 Drawing Figures

OPERATOR CARRIAGE

The present invention relates to an operator carriage used in a coal or metal mine.

The mining operation at a long-walled pit face in a coal or metal mine is carried out using such mechanical apparatus as ranging drum shearers. However, in a pit face whose coal bed is low in its height, the operation space to so narrow that the operation efficiency is reduced to adversely effect the mining cost. At a long-walled pit face at which mechanical apparatus are employed usually two operators work with each other to operate the shearer and the self-advancing supports. The operators move along the pit face according to the movement of the shearer. However, the above-mentioned pit face whose coal bed is low in its height does not allow the operators to work standing, so that the shearing speed of the shearer and the shifting speed of the self-advancing supports must be reduced to lower the mining capacity.

It is, therefore, an object of the present invention to provide an operator carriage which allows the operators to work independently of the height of the pit face and of the shearing speed of the shearer.

This and other objects as well as the merits of the present invention will be apparent from the following detailed description with reference to the accompanying drawings.

Figure 1:
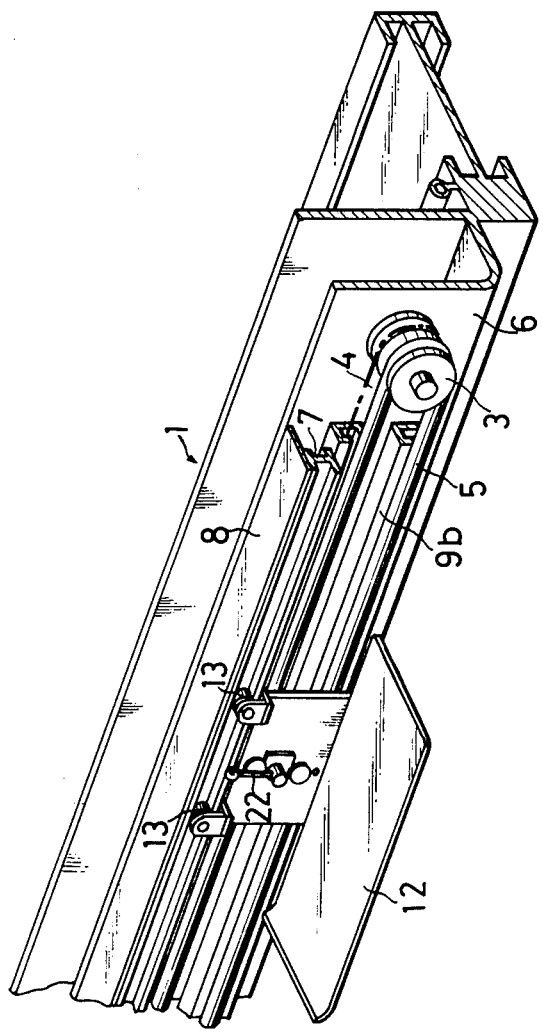
FIG. 1 is an isometric view of an embodiment of the present invention.
Figure 1:
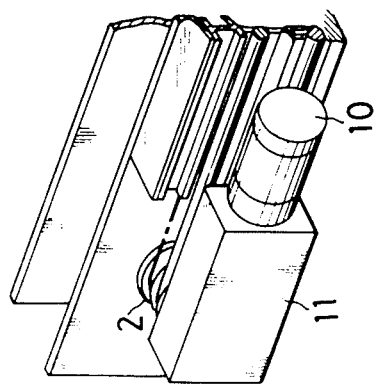

In FIG. 1 numeral 1 represents a conveyor, to one end of which are attached sprockets 2 driven by a motor which will be described later and to the other end of which are attached freely rotating sprockets 3. Between each pair of sprockets 2 and 3 are endlessly stretched a driving chain 4 and a guiding wire 5, respectively. To the side of a spill plate 6 of the conveyor 1 is attached a guide rail 7 through a holding plate 8. A pair of chain-guiding channels 9a are also attached under the holding plate 8 to the same side of the spill plate 6. The endlessly running members 4 and 5 stretched between each pair of sprockets 2 and 3 are driven by a motor 10 through a reduction gear 11. Numeral 12 represents an operation table which carries an operator to operate the shearer or the like and which is suspended through guide rollers 13 and 13 from the guide rail 7.

Figure 2:
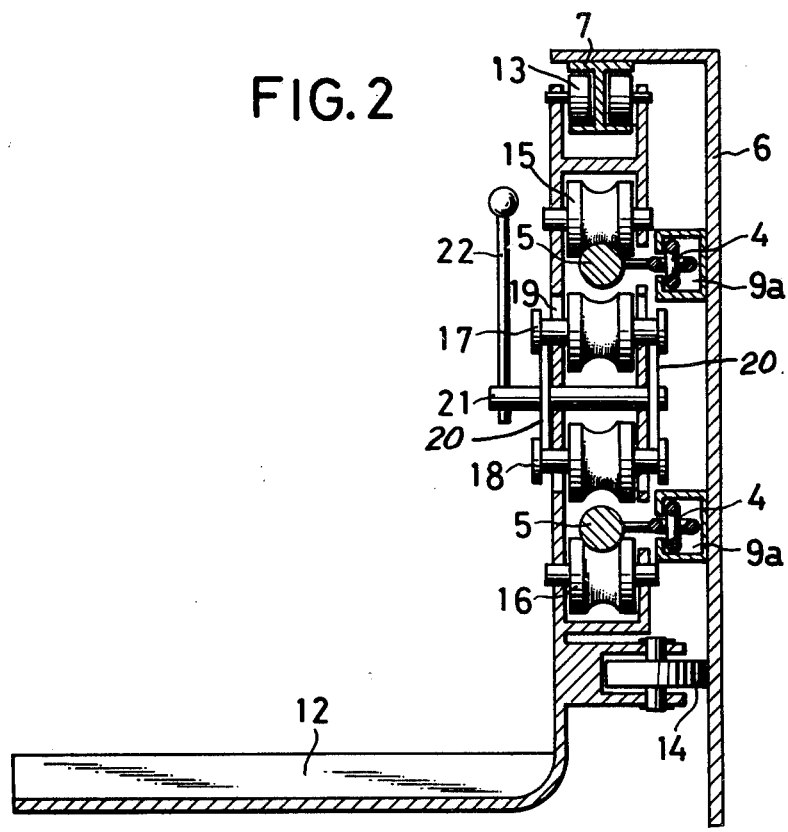
FIG. 2 is an enlarged sectional view thereof.
Figure 3:
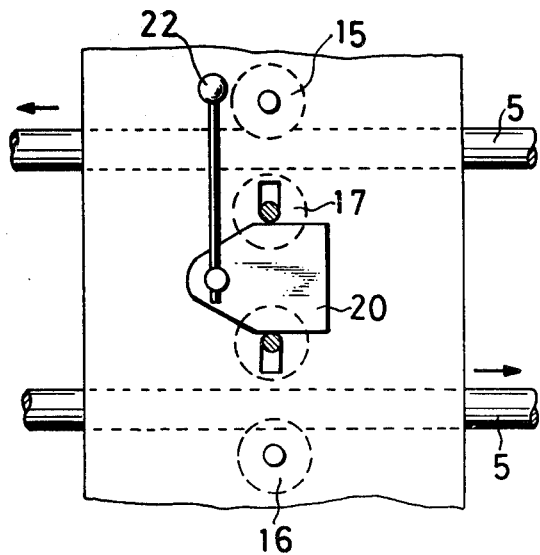
FIG. 3 is an enlarged front view showing, the main components of the operating mechanism of the embodiment.

Referring to FIGS. 2 and 3, the operation table 12 is freely and movably suspended by the guide rollers 13 from the guide rail 7, which is attached to the upper side of the spill plate 6 of the conveyor 1, and has a roller 14 arranged at the lower end thereof, the roller 14 being able to freely and rotatably contact the spill plate 6 and serving to determine the position of the table 12 relative to the spill plate 6. Numerals 15 and 16 denote rollers to freely and rotatably contact the guide wire 5 and being supported between the side plates of the table 12. Numerals 17 and 18 represent driving rollers whose supporting axels are inserted through bearing portions 19 and 19, respectively, provided in the side plate of the table 12. Each bearing portion 19 has a slit extending in the vertical direction, thus permitting the axel, which holds the driving roller, to move in the upper and lower direction. Though not shown in the Figures, each of the axels for holding the driving rollers thereon is usually urged against cams by means of a spring. Numerals 20 and 20 denote cams which are connected with each other through a rod 21 and which perform their eccentric movement by means of an operating lever 22. When the cams 20 and 20 are moved by means of the lever 22 to attain their eccentric upward movement, the upper driving roller 17 whose axel is in contact with these cams 20 and 20 is moved upwards and brought into contact with the upper portion of the guide wire 5 to hold it between the rollers 15 and 17. When the cams 20 and 20 attain their eccentric downward movement, the lower driving roller 18 is brought into contact with the lower portion of the guide wire 5 to hold it between the rollers 16 and 18. The wire holding force attained between the rollers 15 and 17 and between the rollers 16 and 18 can be adjusted by changing the eccentric amount of the cams 20 and 20 by means of the lever 22. When the wire holding force is increased to the greatest extent, though the roller 15 or 16 is allowed to freely rotate, the driving roller 17 or 18 is not allowed to rotate due to the frictional contact between the driving roller supporting rod and the cams, so that the driving roller 17 or 18 is brought into a condition as though fixed to a special point of the guide wire 5 to enable the table 12 to be moved according to the running guide wire 5.

The chain 4 and the guide wire 5 each stretched between each pair of the sprockets 2 and 3 arranged at both ends of the conveyor 1 are driven at a constant speed via the reduction gear 11 by the motor 10. As shown by arrows in FIG. 3, the upper portions of the chain 4 and the guide wire 5 run in a direction reverse to the direction in which the lower portions thereof run. When the operator on the table 12 causes the lever 22 the cams 20 and 20 to attain their eccentric upward movement so as to lift the driving roller 17 upwards, the upper portion of the guide wire 5 is held between the rollers 15 and 17. When the holding force between the rollers 15 and 17 is strong, the roller 15 rotates freely but the driving roller 17 is not allowed to rotate because the frictional contact caused between the driving roller supporting axle and the cams is great, so that the driving roller 17 is caused to move with the running guide wire 5. Since the driving roller 17 is fixed to the table 12, the table 12 is caused to move in the direction shown by the arrow in FIG. 3 due to the engagement between the guide wire 5 and the driving roller 17. When the wire holding force which can be freely adjusted by the lever 22 is decreased, the table 12 is caused to move more slowly than the running speed of the guide wire 5 because the frictional resistance between the guide wire 5 and the driving roller 17 is also reduced. In order to move the table 12 in the reverse direction the lever 22 may be operated to let the lower portion of the guide wire 5 be held between the rollers 16 and 18.

It will be understood that the present invention is not limited to the illustrated embodiment but also includes the following modes alternative embodiments.

1. An embodiment in which the chain 4 and the guide wire 5 are formed as a single member. For example, without arranging the chain 4, only the guide wire 5 serves to move the table 12.

2. An embodiment in which the chain 4 is a wire or rope.

3. An embodiment in which the rollers 15 and 16 and the driving rollers 17 and 18 are arranged not to rotate.

In this case it is not necessary to form them as rollers but they may be formed as holding members.

4. An embodiment in which the driving rollers 17 and 18 are individually moved by their respective operating means.

5. An embodiment in which the moving direction and speed of the table 12 are attained by electrical controls applied to the motor 10. In this case an operating means for remotely controlling the motor 10 is attached to the table 12.

The operator carriage of the present invention having such arrangement and function as described above enables the operator on the table to freely change the position at which the operator works, and therefore enables the mining efficiency to be enhanced with the mining cost decreased.

What is claimed is:

1. An operator's carriage for use with a conveyor, comprising a spill plate on said conveyor, guide rails mounted on said spill plate, an operating table, guide rollers mounted on said operating table, said guide rollers engaging said guide rails to thereby provide a movable support for said operating table on said spill plate, pulley means mounted on said spill plate, an endless running means carried over said pulley means and having an upper run and a lower run, power means for driving said pulley means to thereby continuously move said upper run in one longitudinal direction and to continuously move said lower run in the opposite longitudinal direction, engaging means mounted on said operating table between said upper and lower runs for connecting the operating table to either the upper or lower run, said engaging means comprising a first engaging member and a second engaging member, said first engaging member being movable between a first position wherein the first engaging member is engaged with said upper run so that the operating table moves with the upper run and a second position wherein said first engaging member is disengaged from said upper run, said second engaging member being movable between a third position wherein the second engaging member is engaged with said lower run so that the operating table moves with the lower run and a fourth position wherein said second engaging member is disengaged from said lower run, and cam means disposed between said first and second engaging members and operable to selectively move either said first engaging member from said first position to said second position or said second engaging member from said third position to said fourth position, whereby said cam means is selectively operable to effect movement of the operating table in either of two directions.

2. An operator's carriage according to claim 1, further comprising a first roller mounted on said operating table above said upper run and a second roller mounted on said operating table below said lower run, said upper run being pressingly engaged between said first roller and said first engaging member when the latter is in said first position, said lower run being pressingly engaged between said second roller and said second engaging member when the latter is in said third position.

3. An operator's carriage according to claim 2 wherein said first and second engaging members are rollers rotatably mounted on said operating table.

4. An operator's carriage according to claim 2, wherein said endless running means comprises a chain and a guide wire, chain guiding channels on said spill plate in which said chain is accommodated, said guide wire being engaged by said engaging means and by said first and second rollers, said pulley means having two axial spaced sections, one section for accommodating said chain and the other section for accommodating said guide wire.

5. An operator's carriage according to claim 1, wherein said cam means comprises a cam plate pivotably mounted on said operating table, and a handle mounted on the cam plate to provide for manual rotation of the cam plate.

* * * * *